United States Patent
Liu et al.

(10) Patent No.: US 10,128,673 B2
(45) Date of Patent: Nov. 13, 2018

(54) PORTABLE DEVICE FOR AIDING LOW TEMPERATURE HIGH POWER OUTPUT OF BATTERY PACK

(71) Applicant: National Engineering Research Center of Advanced Energy Storage Materials (Shenzhen) Co., Ltd., Shenzhen, Guangdong (CN)

(72) Inventors: Hong bing Liu, Guangdong (CN); Shun hua Hu, Guangdong (CN); Xiao feng Chen, Guangdong (CN); Gui nan Zhou, Guangdong (CN); Fa ping Zhong, Guangdong (CN)

(73) Assignee: NATIONAL ENGINEERING RESEARCH CENTER OF ADVANCED ENERGY STORAGE MATERIALS (SHENZHEN) CO., LTD., Shenzhen (CN)

( * ) Notice: Subject to any disclaimer, the term of this patent is extended or adjusted under 35 U.S.C. 154(b) by 117 days.

(21) Appl. No.: 15/365,966

(22) Filed: Dec. 1, 2016

(65) Prior Publication Data

US 2017/0201112 A1    Jul. 13, 2017

Related U.S. Application Data

(63) Continuation of application No. PCT/CN2016/075468, filed on Mar. 3, 2016.

(30) Foreign Application Priority Data

Jan. 13, 2016    (CN) .......................... 2016 1 0020916

(51) Int. Cl.
*H02J 7/00* (2006.01)
*H01M 10/44* (2006.01)
(Continued)

(52) U.S. Cl.
CPC ......... *H02J 7/0063* (2013.01); *H01M 10/441* (2013.01); *H01M 10/443* (2013.01);
(Continued)

(58) Field of Classification Search
CPC .... H02J 7/0063; H02J 7/0026; H01M 2/1077; H01M 2220/20
(Continued)

(56) References Cited

U.S. PATENT DOCUMENTS 6,181,103 B1 *    1/2001    Chen ....................... G06F 1/263
                                                          320/106
8,269,458 B2 *    9/2012    Cruise ................. H01M 10/425
                                                          320/112
(Continued)

FOREIGN PATENT DOCUMENTS

CN    104835994 A    8/2015
CN    105216632 A    1/2016

OTHER PUBLICATIONS

International Search Report of PCT Patent Application No. PCT/CN2016/015468 dated Oct. 19, 2016.

*Primary Examiner* — M Baye Diao (57) ABSTRACT

Disclosed is a portable device for aiding low temperature high power output of a battery pack, the device including a primary loop and a control unit, in which: the primary loop is configured as a working loop of the battery pack and comprises a power resistor, herein two ends of the power resistor are electrically connected with the positive/negative terminal of the battery pack respectively, and the battery pack discharges at low temperatures through the power resistor so that an internal temperature of the battery pack rises; and the control unit is configured to control on/off of the primary loop.

11 Claims, 5 Drawing Sheets

(51) Int. Cl.
*H01M 10/615* (2014.01)
*H01M 10/6571* (2014.01)

(52) U.S. Cl.
CPC ..... *H01M 10/615* (2015.04); *H01M 10/6571* (2015.04); *H02J 7/0029* (2013.01)

(58) Field of Classification Search
USPC ........................................ 320/112, 134, 152
See application file for complete search history.

(56) References Cited

U.S. PATENT DOCUMENTS

| | | | | |
|---|---|---|---|---|
| 8,283,893 | B2 * | 10/2012 | Lee | H02J 7/0031 320/134 |
| 9,186,787 | B2 * | 11/2015 | Noda | B25F 5/00 |
| 2009/0153103 | A1 * | 6/2009 | Ikeuchi | H02J 7/0091 320/152 |
| 2010/0260077 | A1 * | 10/2010 | Nakatani | H04B 1/525 370/278 |
| 2012/0056587 | A1 * | 3/2012 | Iida | H01M 10/441 320/118 |

* cited by examiner

PORTABLE DEVICE FOR AIDING LOW TEMPERATURE HIGH POWER OUTPUT OF BATTERY PACK

CROSS-REFERENCE TO RELATED APPLICATIONS

The present application is a Continuation Application of PCT application No. PCT/CN2016/075468 filed on Mar. 3, 2016, which claims the priority of Chinese patent application No. 201610020916.2 filed on Jan. 13, 2016, the contents of which are hereby incorporated by reference.

TECHNICAL FIELD

The present disclosure relates to an aiding device of a battery pack, and in particular to a portable device for aiding low temperature high power output of a battery pack, which enables the battery pack to have high power output at low temperatures.

BACKGROUND

With the development of chemical battery pack techniques, chemical battery packs have rapidly-improved specific energy and gradually-reduced cost per unit. And with features such as rapid response, convenience in setting and the like, the application of battery packs becomes increasingly widespread. As energy supplying devices in digital products, battery packs have features such as portability and high energy density. In connection of new energy resources (such as wind power generation, solar power generation), battery packs are used as energy buffering devices to smooth new energy resources and improve popularity of new energy resources; in automobiles, battery packs are used as devices for recovering braking energy, double as auxiliary power providing devices (generally for HEVs or PHEVs) in special working conditions (such as starting-up, acceleration), or used directly as all-energy resources for automobiles (in the case of PEVs); in micro smart grids, as energy buffering platforms, battery packs are used to balance power generation and power consumption so as to maintain stable and economical operation of a whole grid.

In general, usage temperatures of battery packs are 0° C. to 45° C., within which battery packs exhibit relatively good comprehensive performances such as high power output performance, cycle life, security performance and the like. If an usage environment of a battery pack is at extremely low temperatures or extremely high temperatures, some performances of the battery pack will be degraded remarkably. For example, at minus 20° C., high power output performance of an LCO lithium-ion battery pack (with its positive active material being lithium cobalt oxide and its negative active material being graphite) will be degraded remarkably.

Therefore, in order to deal with working conditions at extremely low environment temperatures, an external environment of the battery pack is usually controlled. For example, in the case of a battery pack used in an EV, in order to enable the battery pack to normally work at low temperatures or high temperatures, a heat management device (such as an air conditioner) is usually provided around the battery pack. However, such a method for controlling environment temperature of the battery pack may generally result in problems of high cost and low efficiency with regard to heat management.

In addition, in some cases (such as ignition during startup of an automobile) where a battery pack works in conditions that high power output is required, the battery pack is required to output a very high power during a very short period of time (about 3 seconds), thus it is not possible for the battery pack to reach a temperature, which enables the battery pack per se to work with high power output, through external heating due to the following reasons: on one hand, it will take a relatively long time and will consume much energy stored in the battery pack; on the other hand, external heating may result in a hidden danger of temperature non-uniformity within the battery pack per se (prolonging heating time can avoid this hidden danger, but excessively long time will defeat the purpose of meeting application requirements, that is, it is impossible for users to accept such a long waiting time). Furthermore, in cases where low temperature high power output is required, low temperature performance of a battery pack can be improved through optimization of battery pack design. However, a change in the chemical system of the battery pack may generally result in a remarkable increase in the battery pack's cost or a remarkable decrease in other performances (such as a decrease in high temperature performance of the battery pack).

SUMMARY

Aiming to the drawbacks in prior arts, the present disclosure is intended to provide a portable device for aiding low temperature high power output of a battery pack, which enables the battery pack to recovery, at low temperatures, its high power output capability within very short period of time.

The present disclosure can be implemented through the following solution: a portable device for aiding low temperature high power output of a battery pack, the device including a primary loop and a control unit, in which: the primary loop is configured as a working loop of the battery pack and comprises a power resistor, herein two ends of the power resistor are electrically connected with the positive terminal and negative terminal of the battery pack respectively, and the battery pack discharges at low temperatures through the power resistor so that an internal temperature of the battery pack rises; and the control unit is configured to control on/off of the primary loop.

In an embodiment, the primary loop may further include a Metal Oxide Semiconductor (MOS) transistor, herein one end of the power resistor is electrically connected with the positive/negative terminal of the battery pack, and the other end of the power resistor is electrically connected with the positive/negative terminal of the battery pack via the MOS transistor.

In an embodiment, the control unit may be configured as a secondary loop comprising a push-button switch, herein the push-button switch is electrically connected between the positive terminal of the battery pack and the MOS transistor, and the push-button switch controls on/off of the primary loop by controlling on/off of the MOS transistor.

In an embodiment, the secondary loop may further include a time-controlled switch, herein the time-controlled switch is connected in series with the push-button switch, and the time-controlled switch controls on/off of the primary loop by controlling on/off of the MOS transistor.

In an embodiment, the secondary loop may further include a temperature protection switch, herein the temperature protection switch is connected in series with the push-button switch and the time-controlled switch, and the temperature protection switch controls on/off of the primary loop by controlling on/off of the MOS transistor.

In an embodiment, the control unit may further be configured as a control switch, herein the control switch is connected in series with the power resistor as a working loop of the battery pack, and configured to control on/off of the primary loop.

In an embodiment, the control switch may include a push-button switch, a temperature control switch and a time-controlled switch connected in series.

In an embodiment, a resistance value of the power resistor satisfies formula (1), and a product of the mass and the specific heat capacity of the power resistor satisfies formula (2):

$$\frac{(N \times 1.6)}{I} \leq R \leq \frac{(N \times 3.0)}{I} \qquad (1)$$

$$\frac{(N \times 1.6)^2}{R} \times 30 \times \frac{1}{(50-t)} \leq m \times C_P \leq \frac{(N \times 3.0)^2}{R} \times 60 \times \frac{1}{(60-t)} \qquad (2)$$

where N is the number of individual cells constituting the battery pack, I is a low-temperature maximum allowable discharging current in A, R is the resistance value of the power resistor in Ω, m is the mass of the power resistor in Kg, $C_P$ is the specific heat capacity of the power resistor in J/(° C.*Kg), and t is an environment temperature in ° C. at which the portable device for aiding low temperature high power output of a battery pack is before being used.

The above parameter settings of the power resistor can admirably achieve the objects of performing aided adjustment of the battery pack at low temperatures. The aiding device is used as a load of the battery pack and is connected with the battery pack to form a circuit so that the battery pack discharges with large current at low temperatures, because the battery pack exhibits a large internal resistance at low temperatures, the large discharging current will result in a large amount of heat from self-heating so that the internal temperature of the battery pack rises during a very short period of time, thereby enabling the battery pack to exhibit high power output capability. And, such an adjustment will not cause overdischarge damage to the battery pack.

In an embodiment, an operating temperature of the temperature protection switch is set to be 10° C. to 55° C., and a working time of the time-controlled switch, during which the time-controlled switch is closed, is set to be 20 to 60 seconds.

The secondary loop implements control of the primary loop, which includes: controlling the primary loop to close or open. The primary loop is closed when the following three conditions are satisfied: the push-button switch of the secondary loop is pressed down and thus closed, the temperature protection switch doesn't reach its open protection temperature value and is thus in a closed state, and the G terminal of the MOS transistor is applied with a forward driving voltage. Then, the battery pack conducts large current discharge via the primary loop. The primary loop is opened when any one of the following three conditions is satisfied: the push-button switch of the secondary loop is released and thus opened, the temperature protection switch reaches its open protection temperature value and is thus in an open state, or the G terminal of the MOS transistor is not applied with a forward driving voltage. Then, the large current discharge of the battery pack ends and the battery pack is protected. The arrangement of the secondary loop can, on one hand, enable the primary loop to be closed for large current discharge at low temperatures, thus temperature rising is implemented through self-heating, and can, on the other hand, limit the duration of large current discharge to avoid overdischarge or excessive temperature rise of the battery pack. Therefore, it is possible to meet self-heating temperature rising requirements and overheating protection requirements simultaneously.

The control switch implements control of the primary loop, which includes: controlling the primary loop to close or open. The primary loop is closed when the following two conditions are satisfied: the push-button switch is pressed down and thus closed, and the temperature protection switch doesn't reach its open protection temperature value and is thus in a closed state. Then, the battery pack conducts large current discharge via the primary loop. The primary loop is opened when any one of the following two conditions is satisfied: the push-button switch is released and thus opened, or the temperature protection switch reaches its open protection temperature value and is thus in an open state. Then, the large current discharge of the battery pack ends and the battery pack is protected. The arrangement of the control switch can, on one hand, enable the primary loop to be closed for large current discharge at low temperatures, thus temperature rising is implemented through self-heating, and can, on the other hand, limit the duration of large current discharge to avoid overdischarge or excessive temperature rise of the battery pack. Therefore, it is possible to meet self-heating temperature rising requirements and overheating protection requirements simultaneously.

Compared with the prior arts, the portable device for aiding low temperature high power output of a battery pack according to the present disclosure has the following technical effects:

(1) rapid self-heating temperature rising of the battery pack can be implemented. For a traditional heating method which heats the battery pack by heating its external environment, the temperature of the battery pack rises gradually, which will take several tens of minutes or even several hours, more time will be taken for the battery pack to reach internal temperature evenness, thus the battery pack cannot meet usage requirements at low temperatures. By virtue of the device for aiding low temperature high power output of a battery pack according to the present disclosure, the battery pack performs large current discharge with a short period of time (generally 20 to 60 seconds) so that the battery pack can be self-heated rapidly, and thus the battery pack can recovery, within 1 to 2 minutes, high power output capability which the battery pack doesn't exhibit originally at low temperatures. By virtue of the device for aiding low temperature high power output of a battery pack, the battery pack performs large current discharge, on one hand, the larger the current, the shorter time required to be taken for the battery pack to rise to a certain temperature through self heating; on the other hand, within the low-temperature maximum allowable discharging current range of the battery pack, the larger the discharge current, the higher the radio between energy for self heating and energy released by the battery pack, and the shorter the time taken for temperature rise through self heating.

(2) effective protection can be implemented during self-heating of the battery pack. The control unit can implement effective control of the primary loop, that is to say, it can effectively control the total amount of energy released by the battery pack, and too excessive temperature rise of the aiding device is avoided. The stronger the battery pack's high power output capability, the quicker the aiding device's temperature rise, this facilitates decreasing of the battery pack's temperature rise through self heating, thus there will not be a phenomenon that the battery pack is overheated by the aiding device.

(2) Rapid recovery of the battery pack's high power output capability can be implemented in low-temperature environments. By virtue of the battery pack aiding device consisting of the primary loop and the control unit, the battery pack obtains rapid temperature rise in environments at low temperatures, such a temperature rise occurs from inside and thus have a good temperature evenness, and is controlled and protected effectively. After the temperature rise of the battery pack, the battery pack reaches its capability of high power output and can operate immediately in corresponding working conditions, such as ignition during starting up of an automobile.

DETAILED DESCRIPTION

Embodiment 1

The disclosure will be further elaborated below in combination with accompanying drawings and embodiments.

Figure 1:
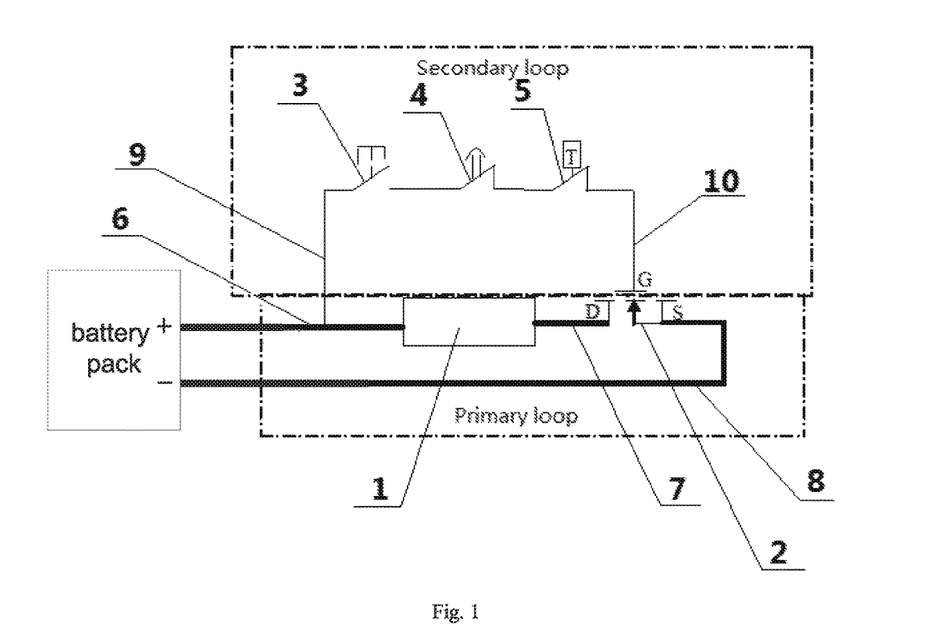
FIG. 1 is a schematic diagram showing the structure of a portable device for aiding low temperature high power output of a battery pack according to embodiment 1.

A portable device for aiding low temperature high power output of a battery pack is as shown in FIG. 1, including: a power resistor 1, an MOS transistor 2, a push-button switch 3, a time-controlled switch 4 and a temperature protection switch 5; the MOS transistor 2 is an N-channel enhancement-type MOS transistor, one end of the power resistor 1 is connected with a positive first wire 6 of the battery pack, the other end of the power resistor 1 is connected with a D terminal of the MOS transistor 2 through a positive second wire 7, and an S terminal of the MOS transistor 2 is connected with a negative wire 8; the push-button switch 3, the time-controlled switch 4 and the temperature protection switch 5 are connected in sequence, the push-button switch 3 is connected with the positive first wire 6 through a third wire 9, and the temperature protection switch 5 is connected with the G terminal of the MOS transistor 2 through a fourth wire 10; a circuit consisting of the positive first wire 6, the power resistor 1, the positive second wire 7, the MOS transistor 2 and the negative wire 8 is a primary loop, and a circuit consisting of the third wire 9, the push-button switch 3, the time-controlled switch 4, the temperature protection switch 5 and the fourth wire 10 is a secondary loop. The primary loop is a working loop which implements aided temperature adjustment of the battery pack at low temperatures; the secondary loop is a control loop which implements control of working time and temperature of the primary loop.

A resistance value of the power resistor satisfies formula (1), and a product of the mass and the specific heat capacity of the power resistor satisfies formula (2):

$$\frac{(N \times 1.6)}{I} \leq R \leq \frac{(N \times 3.0)}{I} \quad (1)$$

$$\frac{(N \times 1.6)^2}{R} \times 30 \times \frac{1}{(50-t)} \leq m \times C_P \leq \frac{(N \times 3.0)^2}{R} \times 60 \times \frac{1}{(60-t)} \quad (2)$$

where N is the number of individual cells constituting the battery pack, I is a low-temperature maximum allowable discharging current in A, R is the resistance value of the power resistor in Ω, m is the mass of the power resistor in Kg, $C_P$ is the specific heat capacity of the power resistor in J/(° C.*Kg), and t is an environment temperature in ° C. at which the portable device for aiding low temperature high power output of a battery pack is before being used.

In the embodiment, the battery pack used by the portable automobile startup power supply is a lithium-ion polymer battery pack that is formed by connection in series of three individual cell, herein, each cell is of a 0845120 type (with a thickness of 8 mm, a width of 45 mm and a height of 120 mm), the positive active material of the cell is lithium cobalt oxide, the negative active material is graphite, and the nominal voltage and capacity of each cell is 3.7 V and 3400 mAh respectively; the rated voltage of the battery pack is 11.1 V, and the rated energy of the battery pack is 37.7 Wh. The battery pack is required to meet a capability of operating for more than 2 seconds with a rated 1000 W power output, and the voltage during working of the battery pack should not be lower than 4.5 V.

In the embodiment, the low-temperature maximum allowable discharging current of the battery pack is 80 A, based on the number N of individual cells consisting of the battery pack being 3 and the low-temperature maximum allowable discharging current of the battery pack being 80 A, it can be calculated according to $$\frac{(N \times 1.6)}{I} \leq R \leq \frac{(N \times 3.0)}{I}$$

that the resistance range of the power resistor is 0.06Ω≤R≤115Ω, the power resistor of 0.10Ω is used in the embodiment. The material of the power resistor 1 in the primary loop is selected based on $$\frac{(N \times 1.6)^2}{R} \times 30 \times \frac{1}{(50-t)} \leq m \times C_P \leq \frac{(N \times 3.0)^2}{R} \times 60 \times \frac{1}{(60-t)},$$

where the number N of individual cells consisting of the battery pack is 3, the resistance R of the power resistor 1 is 0.1Ω, and the environment temperature t, at which the portable device for aiding low temperature high power output of a battery pack is before being used, is −20° C., then it can be calculated that 98.7 J/° C.≤m×$C_P$≤607.5 J/° C., and the material of the power resistor is selected as m×$C_P$=210 J/° C. in the embodiment. In the embodiment, the MOS transistor 2 is selected as an N-channel enhancement-type MOS transistor (with a turn-on voltage of 4 V, a maximum drain current $I_D$ of 120 A), the temperature protection switch 5 is of a normal closed type (with an operating temperature of 45±2° C. and a reset temperature of 40±2° C.), and the time-controlled switch 4 is of a normal open type (it closes upon reception of a triggering signal from the push button switch, and opens after 40 seconds elapse); each of the current-carrying cross sections of the positive first wire 6, the positive second wire 7 and the negative wire 8 in the primary loop has an area of 16 mm², and each of the current-carrying cross sections of the third wire 9 and the fourth wire 10 in the secondary loop has an area of 1 mm².

Figure 2:
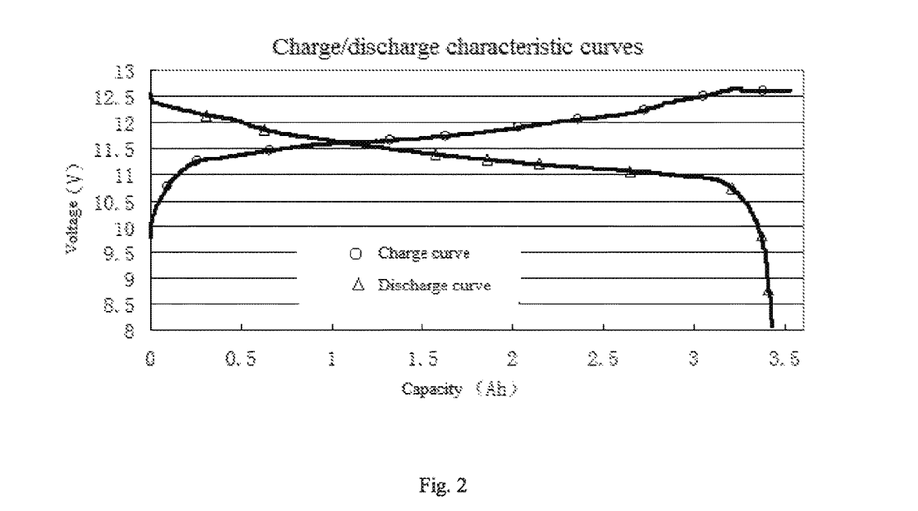
FIG. 2 shows a charge characteristic curve and a discharge characteristic curve of the battery pack in embodiment 1 at an ambient temperature of 20±3° C.

At an ambient temperature of 20±3° C., remaining charges of the battery pack are discharged with a discharge current of 680 mA to 8.0 V, charged with a constant current of 3400 mA to 12.6 V, and charged with a constant voltage of 12.6 V until the current is gradually decreased to 170 mA, then the charging ends, and after 15 minutes, the battery pack is discharged with a constant current of 3400 mA to 8.0 V; the charging capacity of the battery pack is 3.52 Ah, the discharging capacity of the battery pack is 3.43 Ah, and the charge characteristic curve and the discharge characteristic curve of the battery pack at an ambient temperature of 20±3° C. are shown in FIG. 2, where the curve represented by "Δ" is the discharge characteristic curve, and the curve represented by "○" is the charge characteristic curve.

Figure 3:
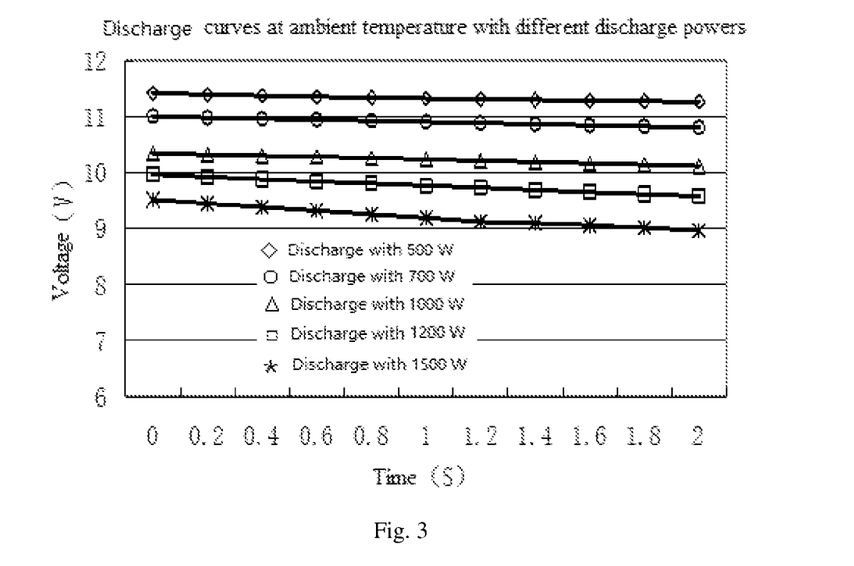
FIG. 3 shows discharge characteristic curves of the battery pack in embodiment 1 at an ambient temperature of 20±3° C. with different discharge powers.

At an ambient temperature of 20±3° C., remaining charges of the battery pack are discharged with a discharge current of 680 mA to 8.0 V, charged with a constant current of 3400 mA to 12.6 V, and charged with a constant voltage of 12.6 V until the current is gradually decreased to 170 mA, then the charging ends, and after 15 minutes, the battery pack is discharged for 2 seconds with a constant power of 1000 W, 700 W, 500 W, 1200 W and 1500 W respectively, herein its blackout protection voltage is 4.5 V; discharge characteristic curves of the battery pack at an ambient temperature of 20±3° C. with different discharge powers are shown in FIG. 3, where the curve represented by "◇" is the discharge curve with a discharge power of 500 W, the curve represented by "○" is the discharge curve with a discharge power of 700 W, the curve represented by "Δ" is the discharge curve with a discharge power of 1000 W, the curve represented by "□" is the discharge curve with a discharge power of 1200 W, the curve represented by "*" is the discharge curve with a discharge power of 1500 W. It can be seen from FIG. 3 that in an environment at an ambient temperature of 20±3° C., the battery pack can completely meet the capability of operating for more than 2 seconds with a rated 1000 W power output, and the total voltage during working of the battery pack is above 10 V, which meets the requirement that the voltage of the battery pack is not smaller than 4.5 V; when outputting for 2 seconds with a rated power of 1500 W, the voltage of the battery pack can still be maintained at 9 V, which indicates that the battery pack exhibits good high power output capability in cases of ambient temperatures.

Figure 4:
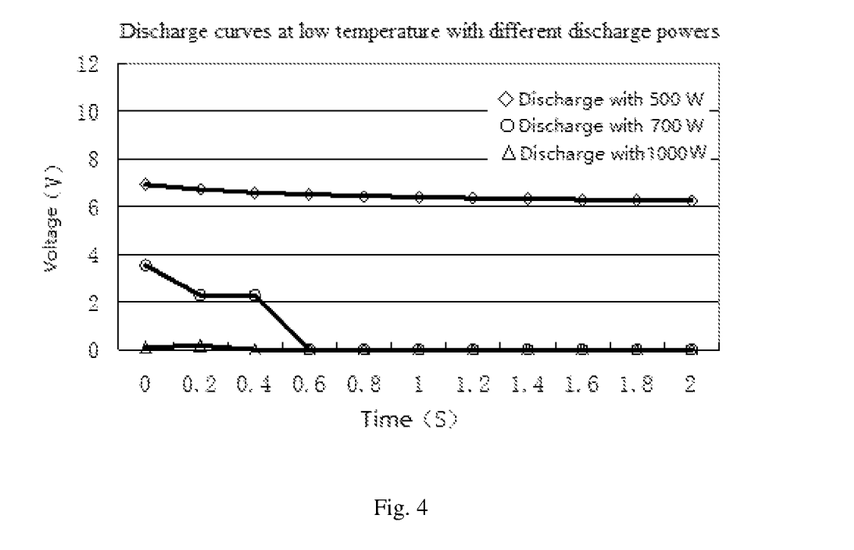
FIG. 4 shows discharge characteristic curves of the battery pack in embodiment 1 at a low temperature of −20±2° C. with different discharge powers.

At an ambient temperature of 20±3° C., the battery pack is charged with a constant current of 3400 mA to 12.6 V, and charged with a constant voltage of 12.6 V until the current is gradually decreased to 170 mA, then the charging ends; and after being maintained at −20±2° C. for 24 hours, the battery pack is discharged for 2 seconds with a constant power of 1000 W, 700 W or 500 W respectively, herein its blackout protection voltage is 0V; discharge characteristic curves of the battery pack at a low temperature of −20±2° C. with different discharge powers are shown in FIG. 4, where the curve represented by "◇" is the discharge curve with a discharge power of 500 W, the curve represented by "○" is the discharge curve with a discharge power of 700 W, and the curve represented by "Δ" is the discharge curve with a discharge power of 1000 W. It can be seen from FIG. 4 that in an environment at a low temperature of −20±2° C., the battery pack cannot meet the capability of operating for more than 2 seconds with a rated 1000 W power output, and if a compulsorily discharging output is made with 1000 W, the voltage of the battery pack will be rapidly decreased to 0 V within 0.5 second. In addition, at a low temperature of −20±2° C., the battery pack cannot meet the capability of operating for more than 2 seconds with a rated 700 W power output, and if a compulsorily discharging output is made with 700 W, the voltage of the battery pack will be rapidly decreased to 0 V within 0.6 second. By further decreasing the output power, in an environment at a low temperature of −20±3° C., the battery pack can operate stably for 2 seconds with a rated 500 W power output, but the voltage of the battery pack is only 7 V to 6 V; compared with an environment at an ambient temperature of 20±3° C., it can be seen from FIG. 3 that the voltage range of the battery pack is 11.5 V to 11.2 V when the battery pack operates for 2 second with the same rated 500 W output. With a decrease in temperature of 40 degree, a discharge voltage plateau of the battery pack with a rated 500 W power output is decreased by more than 40%.

At an ambient temperature of 20±3° C., the battery pack is charged with a constant current of 3400 mA to 12.6 V, and charged with a constant voltage of 12.6 V until the current is gradually decreased to 170 mA, then the charging ends; and after being maintained at −20±2° C. for 24 hours, the positive terminal and negative terminal of the battery pack are connected respectively with a positive first wire and a negative wire of the portable device for aiding low temperature high power output of a battery pack. The push button switch of the portable device for aiding low temperature high power output of a battery pack is pressed down, the time-controlled switch closes upon reception of a triggering signal from the push button switch, and the temperature protection switch is in a normal closed state since the environment temperature of −20±2° C. is not within its set working temperature range; thus a forward voltage of the secondary loop is applied to the G terminal of the MOS transistor, the voltage of G-S reaches the MOS transistor's turn-on voltage of 4V, thus the MOS transistor is turned on; the battery pack outputs power to a load (i.e., the power resistor) through the primary loop, thus the temperature of the power resistor rises, and after timing for 40 seconds, the time-controlled switch opens, then the forward bias voltage between the G and S terminals of the MOS transistor is removed, the MOS transistor is turned off, the primary loop stops discharging, thus the battery pack is protected against discharge.

Figure 5A:
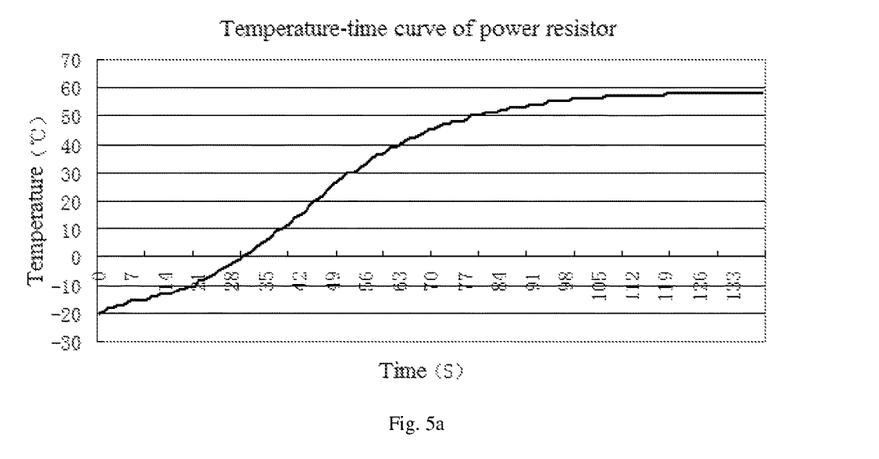
FIG. 5a shows a temperature-time curve of a power resistor when the battery pack in embodiment 1 is adjusted at a low temperature of −20±2° C. using a portable device for aiding low temperature high power output of a battery pack.

FIG. 5a shows a temperature-time curve of a power resistor when the battery pack is adjusted at a low temperature of −20±2° C. using a portable device for aiding low temperature high power output of a battery pack, and it can be seen from FIG. 5a that the temperature of the power resistor rises rapidly from −20° C. to nearly 40° C. within 60 seconds, and further rises to 55° C. within a subsequent 40 seconds. The rapid rise in the temperature of the power resistor within the first 60 seconds is a result of high power output from the battery pack to the power resistor, and the rise in the temperature within the subsequent 40 seconds is a result of a surface temperature of the power resistor lagging behind its internal temperature and a measured temperature lagging behind the practical temperature. During the process that the battery pack discharges and outputs power to the power resistor through the primary loop, the battery pack also consumes power since the internal resistance of the battery pack increases remarkably in low-temperature environments (in the case of being fully charged, in an environment at an ambient temperature of 20±3° C., the battery pack according to the embodiment has an AC internal resistance of 6.1 milliohm at 1000 Hz, whereas it has an AC internal resistance of 14.1 milliohm at 1000 Hz in an environment at a low temperature of −20±2° C., that is to say, the internal resistance increases by a factor of 2.3 at low temperatures with respect to ambient temperatures). Therefore, during working with low temperature high power output, the battery pack per se consumes a large amount of energy due to the presence of polarization, thereby resulting in a self-heating phenomenon.

Figure 5B:
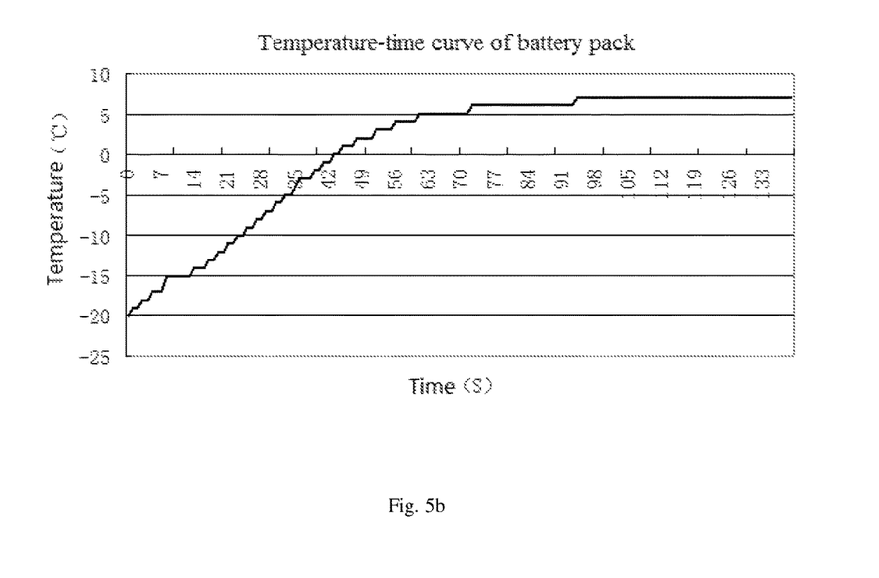
FIG. 5b shows a temperature-time curve of the battery pack in embodiment 1 when it is adjusted at a low temperature of −20±2° C. using a portable device for aiding low temperature high power output of a battery pack.
Figure 5C:
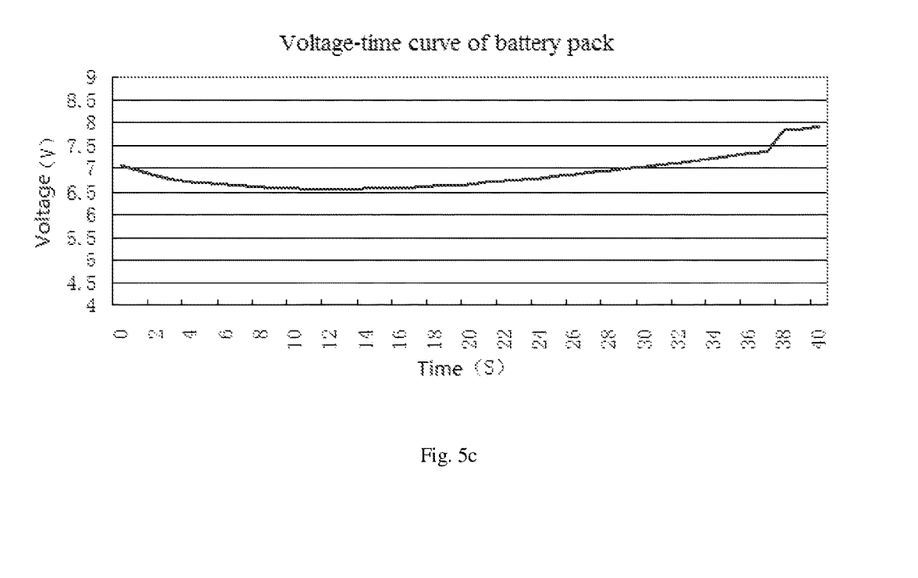
FIG. 5c shows a voltage-time curve of the battery pack in embodiment 1 when it is adjusted at a low temperature of −20±2° C. using a portable device for aiding low temperature high power output of a battery pack.

FIG. 5b shows a temperature-time curve of the battery pack when it is adjusted at a low temperature of −20±2° C. using a portable device for aiding low temperature high power output of a battery pack, and it can be seen from FIG. 5b that the battery pack is rapidly self-heated within 60 seconds, and its temperature rises from −20° C. to +5° C. FIG. 5c shows a voltage-time curve of the battery pack when it is adjusted at a low temperature of −20±2° C. using a portable device for aiding low temperature high power output of a battery pack; it can be seen from FIG. 5c that during the 40-second process that the battery pack outputs power to the power resistor, the voltage of the battery pack decreases from 7 V to 6.5 V and then increases gradually to 7.8 V, this is because as the discharging of the battery pack proceeds, the rapid temperature rise of the battery pack as known from FIG. 5b strengthens the high power output capability of the battery pack, thus instead of decreasing as the discharging proceeds, the discharging plateau increases. The arrangement of the temperature protection switch takes into account the fact that as a portable device, it is required to meet personal safety requirement, that is, the low temperature aiding device should not be overheated so as to avoid injury to humans. The operating temperature of the temperature protection switch is set to be 45±2° C. so that the outer housing of the device for aiding low temperature high power output of a battery pack is not higher than 40° C.; in addition, the temperature protection switch is connected in series with the time-controlled switch in the secondary loop, thus in case that the set value of the time-controlled switch is too long or there exists other failures, the temperature protection switch can provide final safeguard based on temperature rise.

Figure 6:
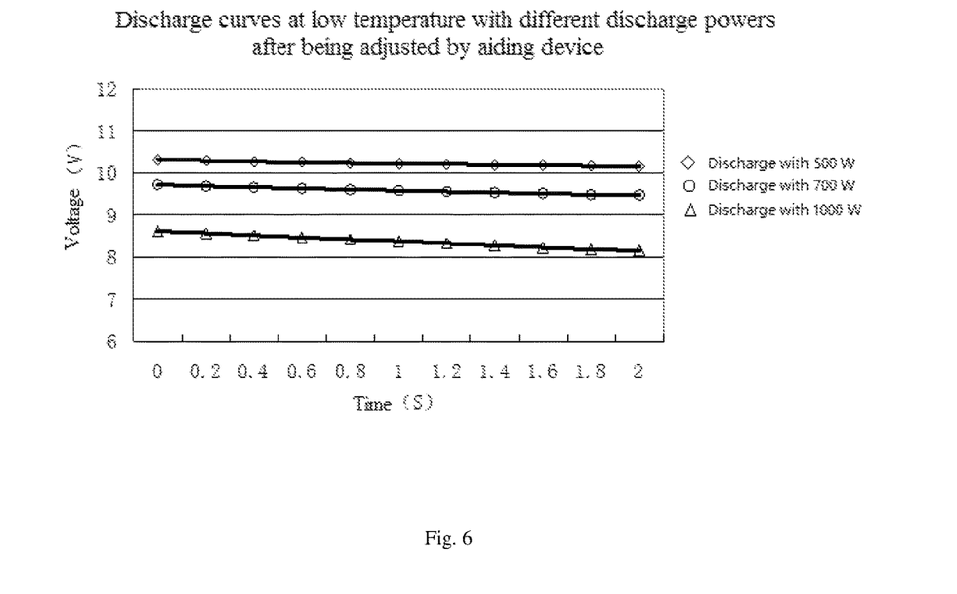
FIG. 6 shows discharge curves with different discharge powers after the battery pack in embodiment 1 is adjusted at a low temperature of −20±2° C. using a portable device for aiding low temperature high power output of a battery pack.

FIG. 6 shows discharge curves with different discharge powers after the battery pack in embodiment 1 is adjusted at a low temperature of −20±2° C. using a portable device for aiding low temperature high power output of a battery pack, where the curve represented by "◊" is the discharge curve with a discharge power of 500 W, the curve represented by "○" is the discharge curve with a discharge power of 700 W, and the curve represented by "Δ" is the discharge curve with a discharge power of 1000 W. It can be seen from FIG. 6 that after the battery pack is adjusted by the device for aiding low temperature high power output of a battery pack, the battery pack changes from not being capable of operating with a 1000 W high power output to being completely capable of performing normal high power output. After the battery pack is self-heated, the battery pack discharging for 2 seconds with a power of 1000 W has a voltage between 8.6 V and 8.1 V, which is lower than the voltage of 10.4 V to 10.1 V, in the case of an ambient temperature of 20±3° C. (corresponding to the curve represented by "Δ" in FIG. 3), by about 2 V, this is because the battery pack still has a temperature of 7° C., and doesn't reach the ambient temperature of 20° C. However, in the case of 7° C., the battery pack can completely meet the requirement in the working condition of ignition during starting up of an automobile; the battery pack completely has the capability of having a 500 W output for 2 seconds, and the plateau of the battery pack is 9.8 V to 9.1 V. The operating plateau of the battery pack having a 500 W output for 2 seconds is 10.3 V to 10.1 V, whereas the plateau at a low temperature of −20° C. is 7.0 V to 6.2 V.

Although the present disclosure is described by taking a lithium ion battery pack of lithium cobalt oxide type as an example, the present disclosure is equally applicable to battery packs or energy modules consisting of rechargeable battery packs such as a lithium ion battery pack including ternary material, a lithium iron phosphate battery pack, a lithium manganese oxide battery pack.

Although the present disclosure is described by taking an automobile startup power supply as an example, the present disclosure is equally applicable to working conditions where a battery pack is required to have high power output at low temperatures, such as a battery pack of a unmanned aerial vehicle, a startup battery pack for an engine.

Embodiment 2

Figure 7:
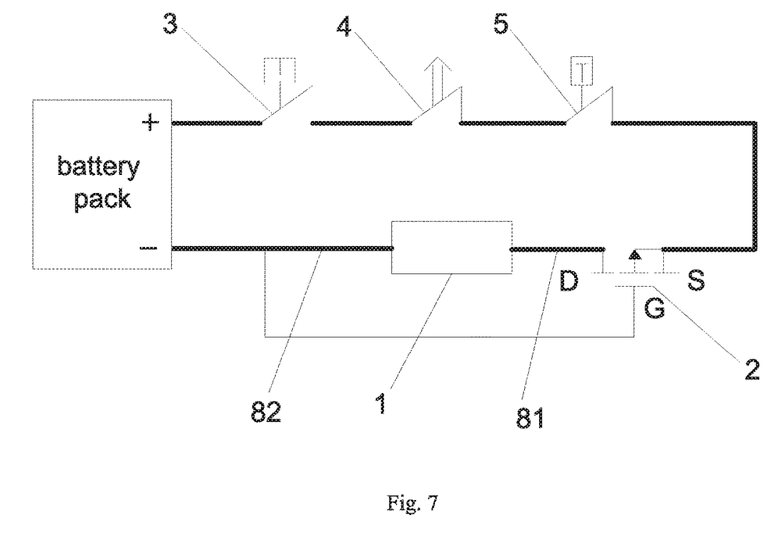
FIG. 7 is a schematic diagram showing the structure of a portable device for aiding low temperature high power output of a battery pack according to embodiment 2.

The difference between the present embodiment and embodiment 1 lies in that the MOS transistor 2 is a P-channel enhancement-type MOS transistor in the present embodiment. As shown in FIG. 7, a portable device for aiding low temperature high power output of a battery pack includes a power resistor 1, an MOS transistor 2, a push-button switch 3, a time-controlled switch 4 and a temperature protection switch 5; herein, the push-button switch 3, the time-controlled switch 4 and the temperature protection switch 5 are connected in sequence through a positive wire, one end of the temperature protection switch 5 is connected with an S terminal of the PMOS transistor 2, a D terminal of the PMOS transistor is connected with one end of the power resistor 1 through a second negative wire 81, the other end of the power resistor 1 is connected with a first negative wire 82; a circuit consisting of the push-button switch 3, the time-controlled switch 4, the temperature protection switch 5, the PMOS transistor 2, the second negative wire 81, the power resistor 1 and the first negative wire 82 is a primary loop; a circuit consisting of the push-button switch 3, the time-controlled switch 4, the temperature protection switch 5, the PMOS transistor 2 and the first negative wire 82 is a secondary loop; the primary loop is a working loop which implements aided temperature adjustment of the battery pack at low temperatures; the secondary loop is a control loop which implements control of working time and temperature of the primary loop.

Embodiment 3

Figure 8:
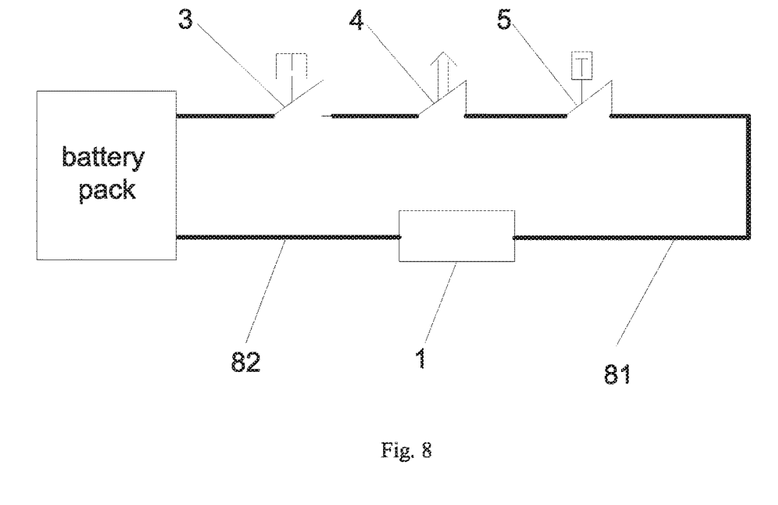
FIG. 8 is a schematic diagram showing the structure of a portable device for aiding low temperature high power output of a battery pack according to embodiment 3.

The difference between the present embodiment and the embodiment 1 and 2 lies in that the MOS transistor is omitted, the control unit is configured as the control switch, and the control switch is connected in series with the power resistor to implement control of the primary loop. As shown in FIG. 8, a portable device for aiding low temperature high power output of a battery pack includes a power resistor 1, a push button switch 3, a time-controlled switch 4 and a temperature protection switch 5; herein, the push button switch 3, the time-controlled switch 4 and the temperature protection switch 5 are connected in sequence through an positive wire, one end of the temperature protection switch 5 is connected with one end of the power resistor 1 through a negative second wire 81, and the other end of the power resistor 1 is connected with a first negative wire 82. The push button switch 3, the time-controlled switch 4, the temperature protection switch 5, the second negative wire 81, the power resistor 1 and the first negative wire 82 form a working loop of the battery pack, and on/off of the working loop is controlled through the push button switch 3, the time-controlled switch 4 and the temperature protection switch 5.

What described above are merely preferred embodiments of the disclosure, it should be noted that some improvements and modifications can be made by those skilled in the art without departing from the principles of the embodiments of the disclosure, and the improvements and modifications fall into the scope of protection of the disclosure.

The invention claimed is:

1. A portable device for aiding low temperature high power output of a battery pack, the device comprising a primary loop and a control unit,
   wherein the primary loop is configured as a working loop of the battery pack and comprises a power resistor, wherein two ends of the power resistor are electrically connected with the positive terminal and the negative terminal of the battery pack respectively, and the battery pack discharges at low temperatures through the power resistor so that an internal temperature of the battery pack rises; and
   the control unit is configured to control on/off of the primary loop.

2. The portable device for aiding low temperature high power output of a battery pack according to claim 1, wherein the primary loop further comprises a Metal Oxide Semiconductor (MOS) transistor, wherein one end of the power resistor is electrically connected with the positive terminal of the battery pack, and the other end of the power resistor is electrically connected with the negative terminal of the battery pack via the MOS transistor.

3. The portable device for aiding low temperature high power output of a battery pack according to claim 2, wherein the control unit is configured as a secondary loop comprising a push-button switch, wherein the push-button switch is electrically connected between the positive terminal of the battery pack and the MOS transistor, and the push-button switch controls on/off of the primary loop by controlling on/off of the MOS transistor.

4. The portable device for aiding low temperature high power output of a battery pack according to claim 3, wherein the secondary loop further comprises a time-controlled switch, wherein the time-controlled switch is connected in series with the push-button switch, and the time-controlled switch controls on/off of the primary loop by controlling on/off of the MOS transistor.

5. The portable device for aiding low temperature high power output of a battery pack according to claim 4, wherein the secondary loop further comprises a temperature protection switch, wherein the temperature protection switch is connected in series with the push-button switch and the time-controlled switch, and the temperature protection switch controls on/off of the primary loop by controlling on/off of the MOS transistor.

6. The portable device for aiding low temperature high power output of a battery pack according to claim 1, wherein the control unit is configured as a control switch, wherein the control switch is connected in series with the power resistor and configured to control on/off of the primary loop.

7. The portable device for aiding low temperature high power output of a battery pack according to claim 6, wherein the control switch comprises a push-button switch, a temperature control switch and a time-controlled switch connected in series.

8. The portable device for aiding low temperature high power output of a battery pack according to claim 1, wherein a resistance value of the power resistor satisfies formula (1), and a product of the mass and the specific heat capacity of the power resistor satisfies formula (2):

$$\frac{(N \times 1.6)}{I} \leq R \leq \frac{(N \times 3.0)}{I} \quad (1)$$

$$\frac{(N \times 1.6)^2}{R} \times 30 \times \frac{1}{(50-t)} \leq m \times C_P \leq \frac{(N \times 3.0)^2}{R} \times 60 \times \frac{1}{(60-t)} \quad (2)$$

where N is the number of individual cells constituting the battery pack, I is a low-temperature maximum allowable discharging current, R is the resistance value of the power resistor, m is the mass of the power resistor, $C_P$ is the specific heat capacity of the power resistor, and t is an environment temperature at which the portable device for aiding low temperature high power output of a battery pack is before being used.

9. The portable device for aiding low temperature high power output of a battery pack according to claim 4, wherein a working time of the time-controlled switch, during which the time-controlled switch is closed, is set to be 20 to 60 seconds.

10. The portable device for aiding low temperature high power output of a battery pack according to claim 5, wherein an operating temperature of the temperature protection switch is set to be 10° C. to 55° C.

11. The portable device for aiding low temperature high power output of a battery pack according to claim 5, wherein a working time of the time-controlled switch, during which the time-controlled switch is closed, is set to be 20 to 60 seconds.

* * * * *